US012341729B2

(12) United States Patent
Runyon et al.

(10) Patent No.: US 12,341,729 B2
(45) Date of Patent: Jun. 24, 2025

(54) TIME-DIVISION DUPLEX (TDD) ANTENNA SYSTEM

(71) Applicant: ViaSat, Inc., Carlsbad, CA (US)

(72) Inventors: Donald L. Runyon, Duluth, GA (US); Charles M. Luke, Cumming, GA (US); Alex C. Panos, Cumming, GA (US); Kurt A. Zimmerman, Dunwoody, GA (US)

(73) Assignee: ViaSat, Inc.

( * ) Notice: Subject to any disclaimer, the term of this patent is extended or adjusted under 35 U.S.C. 154(b) by 732 days.

(21) Appl. No.: 17/278,531

(22) PCT Filed: Oct. 3, 2019

(86) PCT No.: PCT/US2019/054555
§ 371 (c)(1),
(2) Date: Mar. 22, 2021

(87) PCT Pub. No.: WO2020/072811
PCT Pub. Date: Apr. 9, 2020

(65) Prior Publication Data
US 2022/0038251 A1   Feb. 3, 2022

Related U.S. Application Data

(60) Provisional application No. 62/768,026, filed on Nov. 15, 2018, provisional application No. 62/741,311, filed on Oct. 4, 2018.

(51) Int. Cl.
H04L 5/14        (2006.01)
H04B 17/318  (2015.01)
H04W 24/08    (2009.01)

(52) U.S. Cl.
CPC ............. H04L 5/14 (2013.01); H04B 17/318 (2015.01); H04W 24/08 (2013.01)

(58) Field of Classification Search
CPC ......... H04L 5/14; H04B 17/318; H04W 24/08
See application file for complete search history.

(56) References Cited

U.S. PATENT DOCUMENTS 5,548,222 A * 8/1996 Jensen ................... H04B 3/487
                                                                  379/22.01
5,680,405 A * 10/1997 Pesetski ................. H04L 1/242
                                                                  714/713

(Continued)

FOREIGN PATENT DOCUMENTS

CN          1159278        9/1997
CN        201682496      12/2010

(Continued)

OTHER PUBLICATIONS

International Preliminary Report on Patentability for corresponding PCT/US2019/054555 issued Apr. 15, 2021.

(Continued)

Primary Examiner — Joseph A Bednash
(74) Attorney, Agent, or Firm — Snell & Wilmer L.L.P.

(57) ABSTRACT

One example includes a self-synchronizing TDD antenna system. The system includes an antenna to communicate transmit and receive signals and an antenna circuit coupled to a user communication system via a transmission line cable. The antenna circuit includes a transmission line measurement circuit to determine signal loss through the transmission line cable and an amplitude adjustment circuit to adjust amplitude of the transmit and/or receive signals based on the determined signal loss. The antenna circuit also includes a transmit detection circuit to monitor signal power of the transmit signal, and a controller to switch the amplitude adjustment circuit from a receive mode to a transmit mode in response to the monitored signal power exceeding a predetermined threshold. In the receive mode, the adjustment circuit applies a receive amplitude adjustment to the (Continued)

receive signal, and in the transmit mode the adjustment circuit applies a transmit amplitude adjustment to the transmit signal.

22 Claims, 9 Drawing Sheets

(56) References Cited

U.S. PATENT DOCUMENTS

| | | | |
|---|---|---|---|
| 6,710,651 B2 | 3/2004 | Forrester | |
| 7,123,939 B1 | 10/2006 | Bird et al. | |
| 7,155,257 B2 | 12/2006 | Bird et al. | |
| 7,302,276 B2 | 11/2007 | Bernhardsson et al. | |
| 7,386,284 B2 | 6/2008 | Thompson | |
| 7,664,468 B2 | 2/2010 | Wong et al. | |
| 7,680,462 B2 | 3/2010 | Wong et al. | |
| 8,302,134 B2 | 10/2012 | Shintani et al. | |
| 9,438,292 B2 | 9/2016 | Sugimoto et al. | |
| 9,491,713 B2 | 11/2016 | Dykyy et al. | |
| 10,021,652 B2 | 7/2018 | Gossner et al. | |
| 10,038,508 B1 | 7/2018 | Kerselaers et al. | |
| 11,626,896 B2 * | 4/2023 | Heo | H04B 1/40 |
| | | | 375/262 |
| 2004/0243326 A1 | 12/2004 | Daoud et al. | |
| 2006/0222060 A1 | 10/2006 | Tsukasa | |
| 2008/0175175 A1 | 7/2008 | Oren et al. | |
| 2011/0269404 A1 | 11/2011 | Hu et al. | |
| 2013/0322251 A1 * | 12/2013 | Kotecha | H04N 21/4363 |
| | | | 370/235 |
| 2015/0065067 A1 | 3/2015 | Sugimoto et al. | |
| 2017/0047962 A1 * | 2/2017 | Gururaj | H04B 1/44 |
| 2019/0123774 A1 * | 4/2019 | Zhan | H04B 3/548 |

FOREIGN PATENT DOCUMENTS

| | | |
|---|---|---|
| CN | 105510766 | 4/2016 |
| CN | 107576879 | 1/2018 |
| JP | H0587848 A | 4/1993 |
| WO | 2008/088862 | 7/2008 |

OTHER PUBLICATIONS

International Search Report & Written Opinion for corresponding PCT/US2019/054555, issued Jan. 17, 2020.

* cited by examiner

TIME-DIVISION DUPLEX (TDD) ANTENNA SYSTEM

The present invention is a U.S. National Stage under 35 USC 371 patent application, claiming priority to Serial No. PCT/US2019/054555, filed on 3 Oct. 2019; which claims priority from U.S. Provisional Application No. 62/741,311, filed 4 Oct. 2018, and U.S. Provisional Application No. 62/768,026, filed 15 Nov. 2018, which are all incorporated herein by reference in their entirety.

TECHNICAL FIELD

This disclosure relates generally to communication systems, and more specifically to a time-division duplex (TDD) antenna system.

BACKGROUND

An antenna array (or array antenna) is a set of multiple antenna elements that work together as a single antenna to transmit or receive radio waves. The individual antenna elements can be connected to a receiver and/or transmitter by circuitry that applies an appropriate amplitude and/or phase adjustment of signals received and/or transmitted by the antenna elements. When used for transmitting, the radio waves radiated by each individual antenna element combine and superpose with each other, adding together (interfering constructively) to enhance the power radiated in desired directions, and cancelling (interfering destructively) to reduce the power radiated in other directions. Similarly, when used for receiving, the separate received signals from the individual antenna elements are combined with the appropriate amplitude and/or phase relationship to enhance signals received from the desired directions and cancel signals from undesired directions.

SUMMARY

One example includes a self-synchronizing TDD antenna system. The system includes an antenna to communicate transmit and receive signals and an antenna circuit coupled to a user communication system via a transmission line cable. The antenna circuit includes a transmission line measurement circuit to determine signal loss through the transmission line cable and an amplitude adjustment circuit to adjust amplitude of the transmit and/or receive signals based on the determined signal loss. The antenna circuit also includes a transmit detection circuit to monitor signal power of the transmit signal, and a controller to switch the amplitude adjustment circuit from a receive mode to a transmit mode in response to the monitored signal power exceeding a predetermined threshold. In the receive mode, the adjustment circuit applies a receive amplitude adjustment to the receive signal, and in the transmit mode the adjustment circuit applies a transmit amplitude adjustment to the transmit signal.

Another example includes a method for communicating at least one of a transmit signal and a receive signal via a time-division duplex (TDD) antenna system comprising an antenna. The method includes providing a calibration signal from an antenna circuit associated with the antenna system to a user communication system on at least one transmission line cable. The method also includes receiving a returned signal corresponding to the calibration signal retransmitted back from the user communication system to the antenna circuit and determining signal loss between the user communication system and the antenna circuit through at least one transmission line cable based on the returned signal. The method also includes monitoring signal power of the transmit signal obtained from the user communication system via the at least one transmission line cable and adjusting an amplitude of the receive signal in a receive mode based on the determined signal loss. The method further includes switching an amplitude adjustment circuit from the receive mode to a transmit mode in response to the monitored signal power exceeding a predetermined threshold, and adjusting an amplitude of the transmit signal in the transmit mode based on the determined signal loss.

DETAILED DESCRIPTION

Figure 1:
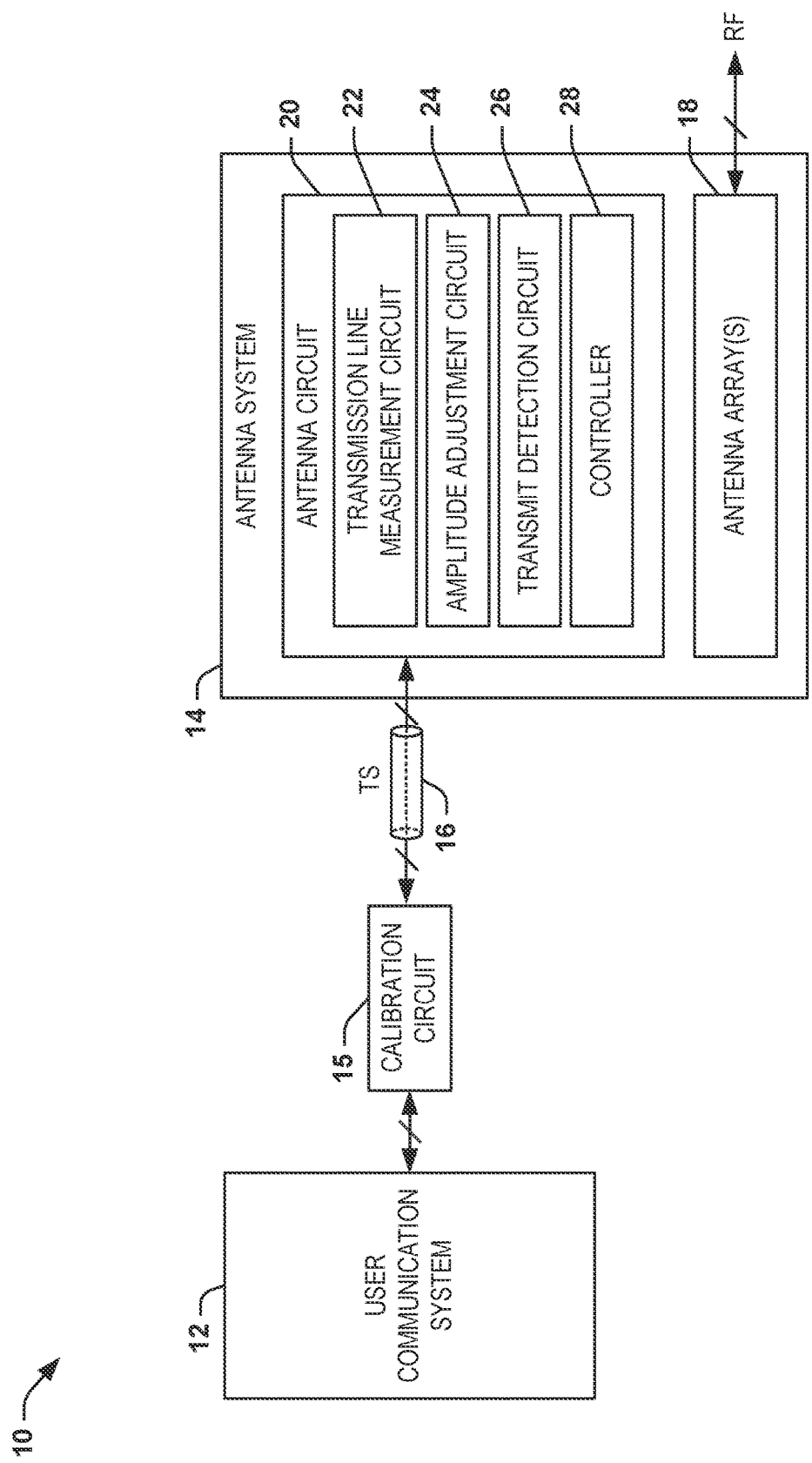
FIG. 1 illustrates an example of a communication system.

This disclosure relates generally to communication systems, and more specifically to a time-division duplex (TDD) antenna system. A communication system can be implemented that includes a user communication system and an antenna system. As an example, the communication system can be implemented as a wireless broadband communication system, such as using a Long Term Evolution (LTE) communication standard. The antenna system can be physically communicatively coupled (e.g., via a transmission line cable) to the user communication system to provide enhanced wireless communication capability for the communication system, such as to provide wireless extension or capability of the user communication system to communicate with a base station (e.g., in a time-division duplex (TDD) manner). For example, the antenna system can provide wireless communication capability for the user communication system based on the user communication system being located in a location that prohibits or impedes wireless connection to a base station based on, for example, intervening physical barriers or extreme range.

The antenna system includes one or more antenna arrays and an antenna circuit. The antenna array(s) can be arranged as any of a variety of antenna arrays to provide a respective one or more wireless signals to be transmitted from and/or received at the antenna system. For example, the antenna array(s) can include an arrangement of antenna elements (e.g., strip-line conductors) to provide signal diversity between two or more respective signal paths, such as based on polarization diversity (e.g., orthogonal polarizations of two separate signal paths). The antenna array(s) can thus each transmit signal(s) and receive signal(s), such as in a TDD manner based on a defined standard on which the user communication system operates. As described herein, the antenna circuit can determine cable losses of the interconnection between the antenna system and the user communication system, such as in a calibration procedure. As a result, the antenna circuit can be implemented to provide attenuation of transmitted signals (hereinafter "transmit signals") provided from the user communication system via the antenna array(s) in a manner that allows the transmit signals to be transmitted at or below a predetermined effective isotropic radiated power (EIRP), such as defined by the operating standard of the user communication system. Additionally, as also described herein, the antenna circuit can be configured to monitor signal power on the respective communication paths to facilitate the TDD operation of the communication system without any input from the user communication system. As a result, the antenna system can be installed to cooperate with the user communication system in a manner that is substantially agnostic of the interconnection between the antenna system and the user communication system, and without active communication between the antenna system and the user communication system.

FIG. 1 illustrates an example of a communication system 10. The communication system 10 can be implemented as a wireless broadband communication system, such as using a Long Term Evolution (LTE) communication standard. In the example of FIG. 1, the communication system 10 includes a user communication system 12 and an antenna system 14. As an example, the user communication system 12 can correspond to a wireless gateway, such as to facilitate wireless communications (e.g., Wi-Fi, Bluetooth, and/or cellular communication) between one or more user devices and a wireless network, such as a cellular network or other wide-area network (WAN).

In the example of FIG. 1, the antenna system 14 is communicatively coupled to a calibration circuit 15 via at least one transmission line cable 16 (e.g., an RG6 cable), such that the calibration circuit 15 interconnects the user communication system 12 and the antenna system 14. As an example, the calibration circuit 15 can include at least one bias-tee configured to inject a DC voltage onto the transmission line cable(s) 16 that are provided to the antenna system 14. Alternatively, the user communication system 12 can provide the DC voltage injection onto the transmission line cable(s) 16. As a result, the DC voltage can provide input power to the antenna system 14, as described in greater detail herein.

As an example, the antenna system 14 can provide enhanced wireless communication capability for the user communication system 12, such as to provide wireless extension or capability of the user communication system 12 to communicate with a base station (e.g., in a time-division duplex (TDD) manner). For example, the antenna system 14 can provide wireless communication capability for the user communication system 12 based on the user communication system 12 being located in a location that prohibits or impedes wireless connection to a base station based on, for example, intervening physical barriers or extreme range.

The antenna system 14 includes one or more antenna arrays 18 and an antenna circuit 20. The antenna array(s) 18 can be arranged as any of a variety of antenna arrays to provide a respective one or more wireless signals to be transmitted from and/or received at the antenna system 14. For example, the antenna array(s) 18 can include an arrangement of antenna elements (e.g., strip-line conductors) to provide signal diversity between two or more respective signal paths, such as based on polarization diversity. For example, the antenna array(s) 18 can include two separate arrays of orthogonally polarized antenna elements to provide orthogonal polarizations of signals propagating in two separate respective signal paths through the antenna circuit 20. The antenna array(s) 18 can thus each transmit signal(s) and receive signal(s), such as bidirectionally in a TDD manner based on a defined standard on which the user communication system 12 operates. In the example of FIG. 1, signals transmitted from and received at the antenna array(s) 18 are demonstrated as signals "RF", and the same signals propagating bidirectionally along the transmission line cable(s) 16 are demonstrated as signals "TS".

The antenna circuit 20 includes a transmission line measurement circuit 22 and an amplitude adjustment circuit 24. The transmission line measurement circuit 22 is configured to determine a signal loss between the user communication system 12 (e.g., the calibration circuit 15) and the antenna circuit 14 through the at least one transmission line cable 16. For example, during installation of the antenna system 14 and/or periodically thereafter, the transmission line measurement circuit 22 can initiate a calibration operation (e.g., in response to a calibration command). As an example, during the calibration operation, the transmission line measurement circuit 22 can be configured to generate a calibration signal, such as a radio frequency (RF) signal, that can be transmitted to the user communication system 12 from the antenna system 14 via the transmission line cable(s) 16, such that the calibration signal can be retransmitted back to the antenna system 14 from the user communication system 12 via the transmission line cable(s) 16. As a result, the transmission line measurement circuit 22 can measure at least one characteristic of the return signal (e.g., power) to determine signal loss exhibited by the transmission line cable(s) 16.

In response to determining the signal loss, the amplitude adjustment circuit 24 can be configured to adjust an amplitude of at least one of transmit signals transmitted from the antenna system 14 and receive signals received at the antenna system 14 based on the determined signal loss. As described herein, the term "transmit signals" refers to signals that are originated at the user communication system 12, propagate through the transmission line cable(s) 16 as a signal TS, and are transmitted from the antenna system 14 via the antenna array(s) 18 as a signal RF. Similarly, the term "receive signals" refers to signals that are received at the antenna system 14 via the antenna array(s) 18 as a signal RF, propagate through the transmission line cable(s) 16 as a signal TS, and are provided to the user communication system 12. The amplitude adjustment circuit 24 can therefore adjust the amplitude of the transmit and receive signals in separate respective signal paths in the antenna circuit 20 based on the signal loss determined during the calibration operation.

For example, the communication system 10 can be configured to operate based on a predetermined communication standard that can dictate a predetermined maximum effective isotropic radiated power (EIRP), such as +23 dBm for the transmit signals. As an example, the amplitude adjustment circuit 24 can include one or more variable circuit elements (VCEs) to amplify or attenuate the transmit signals (e.g., down to less than the predetermined maximum EIRP) and/or the receive signals (e.g., down to less than a maximum saturation power associated with the antenna circuit 14 and/or the user communication system 12). For example, the antenna array(s) 18 can be designed with sufficient gain, or the antenna circuit 20 can be sufficiently high to provide the transmit signals at a power level that is greater than the predetermined maximum EIRP (e.g., to overcome power losses of the transmission line cable(s) 16 regardless of the length of the transmission line cable(s) 16), such that the transmit signals can be attenuated down to approximately the predetermined maximum EIRP. Therefore, the antenna system 14 can be installed in a manner that is substantially agnostic of the length and/or loss characteristics of the transmission line cable(s) 16 based on the calibration operation to determine the signal loss of the transmission line cable(s) 16.

In the example of FIG. 1, the antenna circuit 20 also includes a transmit detection circuit 26 and a controller 28. As described previously, the communication system 10 can operate based on a TDD communication standard, such that the transmit signals and the receive signals can be interleaved with each other on a given signal path between the user communication system 12 and the antenna array(s) 18. The transmit detection circuit 26 can be configured to measure power on a given signal path in the antenna circuit 20 to determine if user communication system 12 is transmitting a transmit signal. Therefore, in response to determining if the user communication system 12 is transmitting a transmit signal, the controller 28 can switch the adjustment circuit 24 from a receive mode (e.g., as a default mode) to a transmit mode to facilitate transmission of the transmit signal from the antenna system 14 via the antenna array(s) 18. Additionally, in response to the transmit detection circuit 26 detecting a decrease in the power of the signal path (e.g., less than the predetermined threshold), the controller 28 can switch the adjustment circuit 24 back to the receive mode from the transmit mode (e.g., upon expiration of a timer).

In response to the transmit detection circuit 26 determining that the user communication system 12 is transmitting a transmit signal, such as based on the power on the signal path being greater than a predetermined threshold, the controller 28 can provide a signal to the amplitude adjustment circuit 24 to switch the signal path from a receive mode to a transmit mode. Therefore, the amplitude adjustment circuit 24 can provide the appropriate amplitude adjustment to the transmit signal (e.g., via a VCE) to facilitate transmission of the transmit signal from the antenna system 14 via the antenna array(s) 18. As an example, the amplitude adjustment circuit 24 can include power amplifier and/or a filter in each of the transmit and receive switchable portions of the signal path, and/or can include a short-circuit bypass path in one of the transmit and receive signal paths.

As a result, the antenna system 14 can operate to facilitate the bidirectional TDD communications between transmit and receive signals without requiring communication or signal transfer from the user communication system 12. Therefore, the antenna system 14 can be installed in a simplistic manner that is largely independent of the operation of the user communication system 12. Additionally, as previously described, the antenna system 14 can be installed in a manner that is agnostic of the length of the transmission line cable(s) 16 interconnecting the antenna system 14 and the user communication system 12. Accordingly, and as described in greater detail herein, the antenna system 14 can be simplistically installed to efficiently facilitate wireless communication between the user communication system 12 and a network hub (e.g., a base station).

Figure 2:
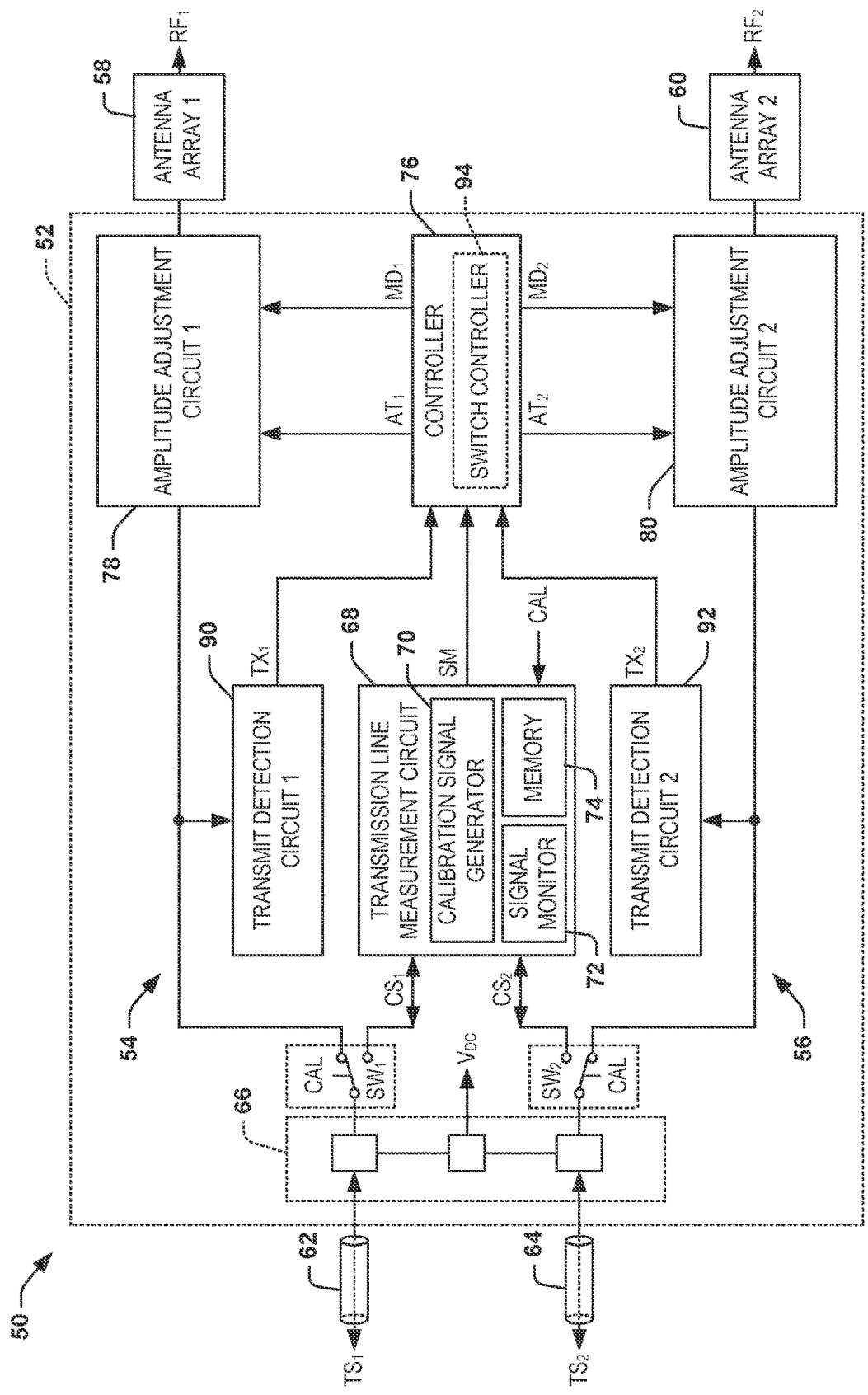
FIG. 2 illustrates an example of an antenna system.

FIG. 2 illustrates an example of an antenna system 50. The antenna system 50 can correspond to the antenna system 14 in the example of FIG. 1. Therefore, reference is to be made to the example of FIG. 1 in the following description of the example of FIG. 2.

The antenna system 50 includes an antenna circuit 52 that is demonstrated in the example of FIG. 2 as including a first signal path 54 and a second signal path 56 that can each correspond to a separate signal diversity type, as described in greater detail herein. The antenna system 50 also includes a first antenna array 58 and a second antenna array 60 that can each be associated with the respective signal diversity types. The antenna arrays 58 and 60 can be arranged as any of a variety of antenna arrays to provide a respective one or more wireless signals to be transmitted from and/or received at the antenna system 50, demonstrated as respective signals $RF_1$ and $RF_2$. For example, the antenna arrays 58 and 60 can include an arrangement of antenna elements (e.g., strip-line conductors) to provide the signal diversity between the two respective signal paths, such as based on polarization diversity. As an example, the antenna arrays 58 and 60 can be configured as separate respective arrays of orthogonally polarized antenna elements to provide orthogonal polarizations of signals propagating in the respective signal paths. The antenna arrays 58 and 60 can thus each transmit and receive signals a TDD manner based on a defined standard on which the user communication system (not shown in the example of FIG. 2) operates.

Additionally, the antenna system 50 is communicatively coupled to the user communication system (e.g., the user communication system 12) via a first transmission line cable 62 configured to propagate a signal $TS_1$ between the user communication system and the antenna circuit 52 and a second transmission line cable 64 configured to propagate a signal $TS_2$ between the user communication system and the antenna circuit 52. For example, the transmission line cables 62 and 64 can be connected to a calibration circuit (e.g., the calibration circuit 15) that is coupled to the user communication system. The transmission line cables 62 and 64 can each be associated with the respective signal diversity types, and thus the respective signal paths of the antenna circuit 52. For example, the transmission line cables 62 and 64 can be configured as RG6 cables or other types of transmission line cables. In the example of FIG. 2, the antenna circuit 52 includes an extraction circuit 66 that can be configured as a DC decoupler (e.g., a bias-tee) that is coupled to the transmission line cables 62 and 64 to extract a DC voltage, demonstrated as a voltage $V_{DC}$, that is provided, such as from the calibration circuit 15, to power the electronics of the antenna circuit 52. Therefore, the antenna system 50 does not require a local power source, such that the antenna system 50 can be installed in a more flexible manner.

The antenna circuit 52 also includes a transmission line measurement circuit 68. The transmission line measurement circuit 68 is configured to determine a signal loss between the user communication system and the antenna circuit 50 through the transmission line cables 62 and 64. For example, during installation of the antenna system 50 and/or periodically thereafter, the transmission line measurement circuit 68 can initiate a calibration operation in response to a calibration command CAL. As an example, the calibration command CAL can be provided in response to a user input, such as via a physical input on the antenna system 50 or the calibration system 15 (e.g., a physical button or a button on a touchscreen), in response to power-up of the antenna system 50 (e.g., automatically in response to initially receiving the voltage $V_{DC}$), periodically from a processor or controller device (e.g., at periodic or programmable intervals), or from any of a variety of other means.

In the example of FIG. 2, the transmission line measurement circuit 68 includes a calibration signal generator 70, a signal monitor 72, and a memory 74. The transmission line measurement circuit 68 is communicatively coupled to the first transmission line cable 62 (via the extraction circuit 66) through a first switch $SW_1$ and to the second transmission line cable 64 (via the extraction circuit 66) through a second switch $SW_2$. In the example of FIG. 2, the switches $SW_1$ and $SW_2$ are demonstrated as being set to a normal operating mode state, and are controlled via the calibration command CAL. Therefore, in the normal operating mode, as in the state demonstrated in the example of FIG. 2, the switch $SW_1$ connects the first signal path 54 to the first transmission line cable 62 and the switch $SW_2$ connects the second signal path 54 to the second transmission line cable 64 to facilitate propagation of the transmit and receive signals between the user communication system and the antenna arrays 58 and 56 via the respective signal paths 54 and 56 and the respective transmission line cables 62 and 64. However, in a calibration mode, such as initiated by the calibration command CAL, the switches $SW_1$ and $SW_2$ can be switched to coupling the transmission line measurement circuit 68 to the first transmission line cable 62 via the first switch $SW_1$ and to the second transmission line cable 64 via the second switch $SW_2$ to facilitate the calibration operation.

During the calibration operation, the calibration signal generator 70 can be configured to generate a calibration signal, such as a dummy RF signal having a predefined frequency. In the example of FIG. 2, the calibration signal is demonstrated as a first calibration signal $CS_1$ and a second calibration signal $CS_2$ corresponding, respectively, to the first and second transmission line cables 62 and 64. The transmission line measurement circuit 68 can thus transmit one or both of the calibration signals $CS_1$ and $CS_2$ to the user communication system via the respective one of the transmission line cables 62 and 64.

The user communication system can be configured to retransmit the calibration signal(s) $CS_1$ and/or $CS_2$ back to the antenna system 50 from the user communication system as respective return signal(s) via the transmission line cables 62 and 64 during the calibration procedure. In response to receiving the return signal(s), the signal monitor 72 can be configured to measure at least one characteristic of the return signal(s) to determine signal loss exhibited by the transmission line cables 62 and 64. For example, the characteristic of the return signal can be power, such that the signal monitor 72 can calculate a power ratio between one of the calibration signals $CS_1$ and $CS_2$ and the respective return signal. Accordingly, the signal monitor 72 can determine the signal loss exhibited by the transmission line cable(s) 62 and 64 based on the power ratio between the calibration signal(s) $CS_1$ and $CS_2$ and the respective return signal. Additionally, other types of characteristics can be monitored instead of or in addition to power, such as delay time, to determine the signal loss exhibited by the transmission line cable(s) 62 and 64. The transmission line measurement circuit 68 can then store the determined signal loss in the memory 74. For example, the memory 74 can store signal loss information for both of the transmission line cables 62 and 64 individually or in combination, and can store the signal loss information for each calibration operation or for the most recent calibration operation. As an example, the memory 74 can be configured as a non-volatile memory, such that the memory 74 can retain the calculated signal loss information during power loss of the antenna system 50. As a result, the calculated signal loss can be retrieved from the memory 74 after power is returned to the antenna system 50 to facilitate operation of the antenna system 50 without the need for a calibration operation.

Figure 3:
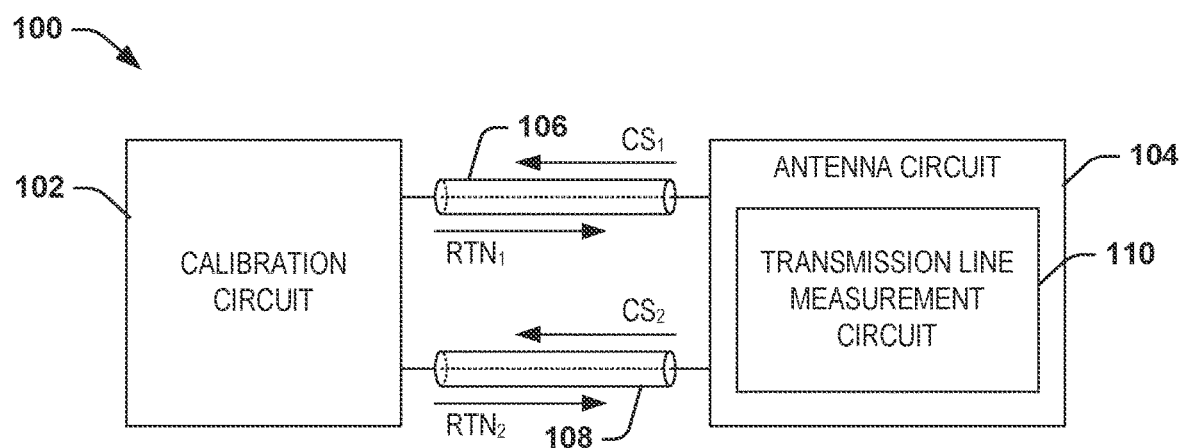
FIG. 3 illustrates an example diagram of calibration of a communication system.
Figure 4:
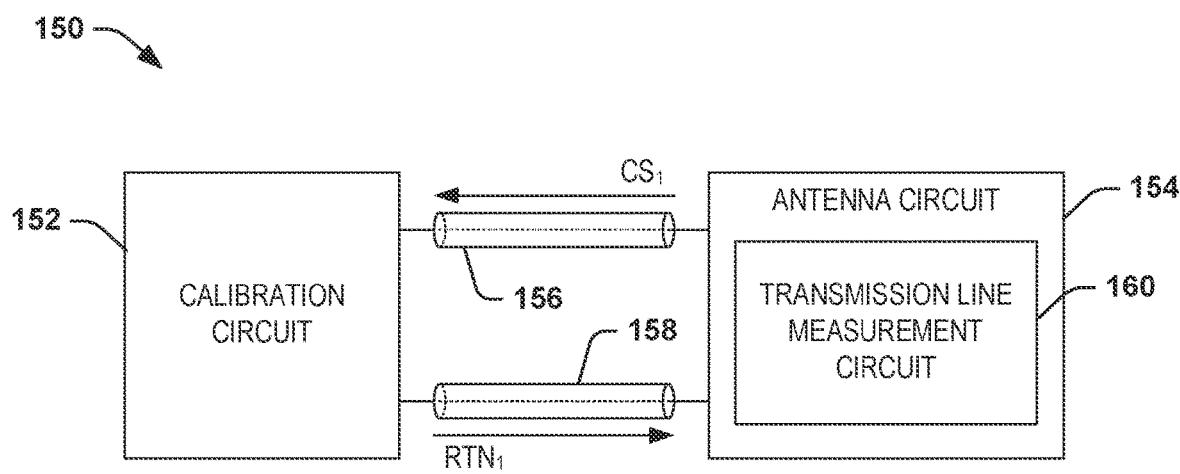
FIG. 4 illustrates another example diagram of calibration of a communication system.

FIGS. 3 and 4 illustrate example diagrams 100 and 150, respectively, of calibration of a communication system. In the example of FIG. 3, the communication system includes a calibration circuit 102 and an antenna system 104 that are communicatively coupled by a first transmission line cable 106 and a second transmission line cable 108. In the example of FIG. 4, the communication system includes a calibration circuit 152 and an antenna system 154 that are communicatively coupled by a first transmission line cable 156 and a second transmission line cable 158. The calibration circuits in the examples of FIGS. 3 and 4 can each correspond to the calibration circuit 15 in the example of FIG. 1. As an example, the calibration circuits 102 and 152 can correspond to the calibration circuit 15, the antenna systems 104 and 154 can correspond to the antenna systems 14 and/or 50, and the transmission line cables 106 and 108 and the transmission line cables 156 and 158 can correspond to the transmission line cable(s) 16 an/or the transmission line cables 62 and 64. Therefore, reference is to be made to the examples of FIGS. 1 and 2 in the following description of the examples of FIGS. 3 and 4.

In the diagram 100, the antenna circuit 104 includes a transmission line measurement circuit 110. During the calibration operation, the transmission line measurement circuit 110 can be configured (e.g., via the calibration signal generator 70) to generate a first calibration signal $CS_1$ that is transmitted by the transmission line measurement circuit 110 along the first transmission line cable 106. The calibration circuit 102 can be configured to retransmit (e.g., reflect) the calibration signal $CS_1$ back to the antenna system 104 as a respective return signal $RTN_1$ via the first transmission line cable 106. Therefore, in the diagram 100, the first transmission line 106 is configured to propagate both the calibration signal $CS_1$ and the reflected return signal $RTN_1$. In response to receiving the return signal $RTN_1$, the transmission line measurement circuit 110 can be configured (e.g., via the signal monitor 72) to measure the at least one characteristic of the reflected return signal $RTN_1$ to determine the signal loss exhibited by the first transmission line cable 106. For example, the characteristic of the reflected return signal $RTN_1$ can be power, such that the transmission line measurement circuit 110 can calculate a power ratio between the calibration signal $CS_1$ and the respective reflected return signal $RTN_1$ to determine the signal loss exhibited by the first transmission line cable 106.

Similarly, the transmission line measurement circuit 110 can repeat the previously described calibration procedure with respect to the second transmission line cable 108. For example, the transmission line measurement circuit 110 can also be configured to generate a second calibration signal $CS_2$ that is transmitted by the transmission line measurement circuit 110 along the second transmission line cable 108. The calibration circuit 102 can be configured to retransmit (e.g., reflect) the calibration signal $CS_2$ back to the antenna system 104 as a respective return signal $RTN_2$ via the second transmission line cable 108. In response to receiving the reflected return signal $RTN_2$, the transmission line measurement circuit 110 can be configured (e.g., via the signal monitor 72) to measure the at least one characteristic of the reflected return signal $RTN_2$ to determine the signal loss exhibited by the second transmission line cable 108, similar to as described previously with respect to the first transmission line cable 106.

In the diagram 150, the antenna circuit 154 includes a transmission line measurement circuit 160. During the calibration operation, the transmission line measurement circuit 160 can be configured (e.g., via the calibration signal generator 70) to generate a first calibration signal $CS_1$ that is transmitted by the transmission line measurement circuit 160 along the first transmission line cable 156. The calibration circuit 152 can be configured to retransmit the calibration signal $CS_1$ back to the antenna system 154 as a respective return signal $RTN_1$ via the second transmission line cable 158. Therefore, in the diagram 150, the first transmission line 156 is configured to propagate the calibration signal $CS_1$ and the second transmission line cable 158 is configured to propagate the return signal $RTN_1$. In response to receiving the return signal $RTN_1$, the transmission line measurement circuit 160 can be configured (e.g., via the signal monitor 72) to measure the at least one characteristic of the return signal $RTN_1$ to determine the signal loss exhibited by the first and second transmission line cables 156 and 158. For example, the characteristic of the return signal $RTN_1$ can be power, such that the transmission line measurement circuit 160 can calculate a power ratio between the calibration signal $CS_1$ and the respective return signal $RTN_1$ to determine the signal loss exhibited by the first and second transmission line cables 156 and 158. As an example, the transmission line measurement circuit 160 can either conclude the calibration operation, or can repeat the previously described calibration procedure with respect to switching the first and second transmission line cables 156 and 158 with respect to transmission of the calibration signal CS and receipt of the return signal RTN.

Figure 5:
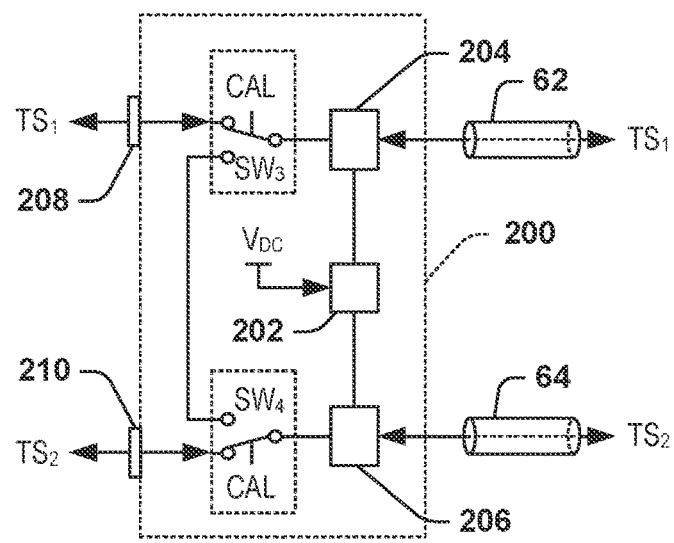
FIG. 5 illustrates an example of a calibration circuit.

FIG. 5 illustrates an example of a calibration circuit 200. The calibration circuit 200 can correspond to the calibration circuit 15 of the example of FIG. 1. Therefore, reference is to be made to the example of FIG. 1 in the following description of the example of FIG. 5. The calibration circuit 200 is configured to connect to the user communication system (e.g., the user communication system 12) to provide DC power to the antenna system 50. For example, the DC power can be a DC bias voltage that is provided on the transmission line cables 62 and 64, such that the extraction circuit 66 extracts the voltage $V_{DC}$ to provide power to the electronic components of the antenna system 50.

The calibration circuit 200 includes a power block 202 that is configured to generate or receive the DC voltage $V_{DC}$ (e.g., approximately 3.3 volts). For example, the power block 202 can be configured as a low-dropout (LDO) voltage regulator, such as to generate the DC voltage $V_{DC}$ from a higher input voltage (e.g., approximately 5 volts). The power block 202 provides the DC voltage $V_{DC}$ to a first injection circuit 204 and a second injection circuit 206. For example, the injection circuits 204 and 206 can be configured as bias-tees. The injection circuits 204 and 206 are each coupled to the transmission line cables 62 and 64 on which the transmit and receive signals $TS_1$ and $TS_2$, respectively, are propagated. Therefore, the injection circuits 204 and 206 are configured to provide the DC voltage $V_{DC}$ onto the transmission line cables 62 and 64.

The calibration circuit 200 includes a first signal port 208 and a second signal port 210 that are coupled to the user communication system 12. The first signal port 208 is configured to propagate the transmit and receive signals $TS_1$ and the second signal port 210 is configured to propagate the transmit and receive signals $TS_2$. The first signal port 208 is coupled to the first transmission line cable 62 via a first switch $SW_3$ and the second signal port 210 is coupled to the second transmission line cable 64 via a second switch $SW_4$. In the example of FIG. 5, the switches $SW_3$ and $SW_4$ are demonstrated as being set to a normal operating mode state, and are controlled via the calibration command CAL. For example, the calibration command CAL can correspond to the same calibration command CAL described in the example of FIG. 2, or can be a different calibration command (e.g., facilitated by a user) that is to be provided during the calibration operation.

Therefore, in the normal operating mode, as in the state demonstrated in the example of FIG. 5, the switch $SW_3$ connects the first signal port 208 to the first transmission line cable 62 and the switch $SW_4$ connects the second signal port 210 to the second transmission line cable 64 to facilitate propagation of the transmit and receive signals between the user communication system and the antenna system 50 via the respective transmission line cables 62 and 64. However, in the calibration mode, such as initiated by the calibration command CAL, the switches $SW_3$ and $SW_4$ can be switched to provide a short circuit between the transmission line cables 62 and 64. As a result, the calibration signal $CS_1$, such as provided in the example of FIG. 4, can be provided from the first transmission line cable 62 and can be retransmitted back to the antenna system 50 as the return signal $RTN_1$ along the second transmission line cable 64. Therefore, with minimal input, the calibration circuit 200 can be implemented in the calibration operation to determine the signal loss of the transmission line cables 62 and 64.

Figure 6:
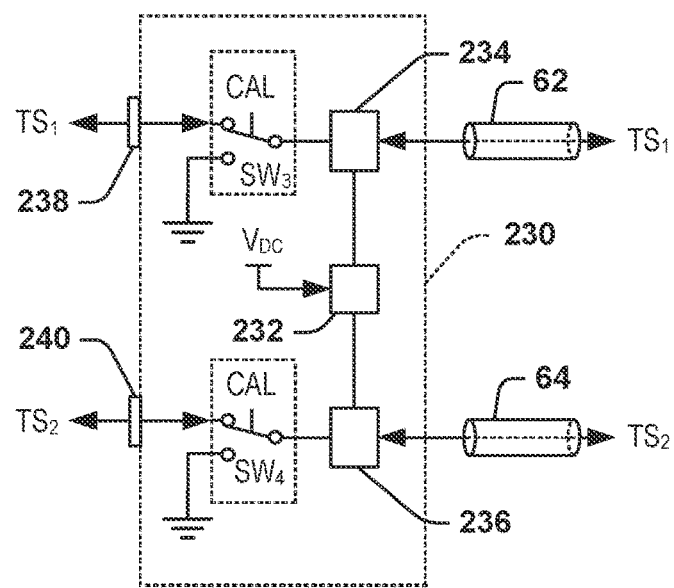
FIG. 6 illustrates another example of a calibration circuit.

FIG. 6 illustrates an example of a calibration circuit 230. The calibration circuit 230 can correspond to the calibration circuit 15 of the example of FIG. 1. Therefore, reference is to be made to the example of FIG. 1 in the following description of the example of FIG. 6. The calibration circuit 230 is configured to connect to the user communication system (e.g., the user communication system 12) to provide DC power to the antenna system 50. For example, the DC power can be a DC bias voltage that is provided on the transmission line cables 62 and 64, such that the extraction circuit 66 extracts the voltage $V_{DC}$ to provide power to the electronic components of the antenna system 50.

The calibration circuit 230 includes a power block 232 that is configured to generate or receive the DC voltage $V_{DC}$ (e.g., approximately 3.3 volts). For example, the power block 232 can be configured as an LDO voltage regulator, such as to generate the DC voltage $V_{DC}$ from a higher input voltage (e.g., approximately 5 volts). The power block 232 provides the DC voltage $V_{DC}$ to a first injection circuit 234 and a second injection circuit 236. For example, the injection circuits 234 and 236 can be configured as bias-tees. The injection circuits 234 and 236 are each coupled to the transmission line cables 62 and 64 on which the transmit and receive signals $TS_1$ and $TS_2$, respectively, are propagated. Therefore, the injection circuits 234 and 236 are configured to provide the DC voltage $V_{DC}$ onto the transmission line cables 62 and 64.

The calibration circuit 230 includes a first signal port 238 and a second signal port 240 that are coupled to the user communication system 12. The first signal port 238 is configured to propagate the transmit and receive signals $TS_1$ and the second signal port 240 is configured to propagate the transmit and receive signals $TS_2$. The first signal port 238 is coupled to the first transmission line cable 62 via a first switch $SW_3$ and the second signal port 240 is coupled to the second transmission line cable 64 via a second switch $SW_4$. In the example of FIG. 6, the switches $SW_3$ and $SW_4$ are demonstrated as being set to a normal operating mode state, and are controlled via the calibration command CAL. For example, the calibration command CAL can correspond to the same calibration command CAL described in the example of FIG. 2, or can be a different calibration command (e.g., facilitated by a user) that is to be provided during the calibration operation.

Therefore, in the normal operating mode, as in the state demonstrated in the example of FIG. 6, the switch $SW_3$ connects the first signal port 238 to the first transmission line cable 62 and the switch $SW_4$ connects the second signal port 240 to the second transmission line cable 64 to facilitate propagation of the transmit and receive signals between the user communication system and the antenna system 50 via the respective transmission line cables 62 and 64. However, in the calibration mode, such as initiated by the calibration command CAL, the switches $SW_3$ and $SW_4$ can be switched to couple each of the transmission line cables 62 and 64 to ground. As a result, the calibration signal $CS_1$, such as provided in the example of FIG. 3, can be provided from the first transmission line cable 62 and can be reflected back to the antenna system 50 as the return signal $RTN_1$ along the first transmission line cable 62. Similarly, the calibration signal $CS_2$, such as provided in the example of FIG. 3, can be provided from the second transmission line cable 64 and can be reflected back to the antenna system 50 as the return signal $RTN_2$ along the second transmission line cable 64. Therefore, with minimal input, the calibration circuit 230 can be implemented in the calibration operation to determine the signal loss of the transmission line cables 62 and 64.

Figure 7:
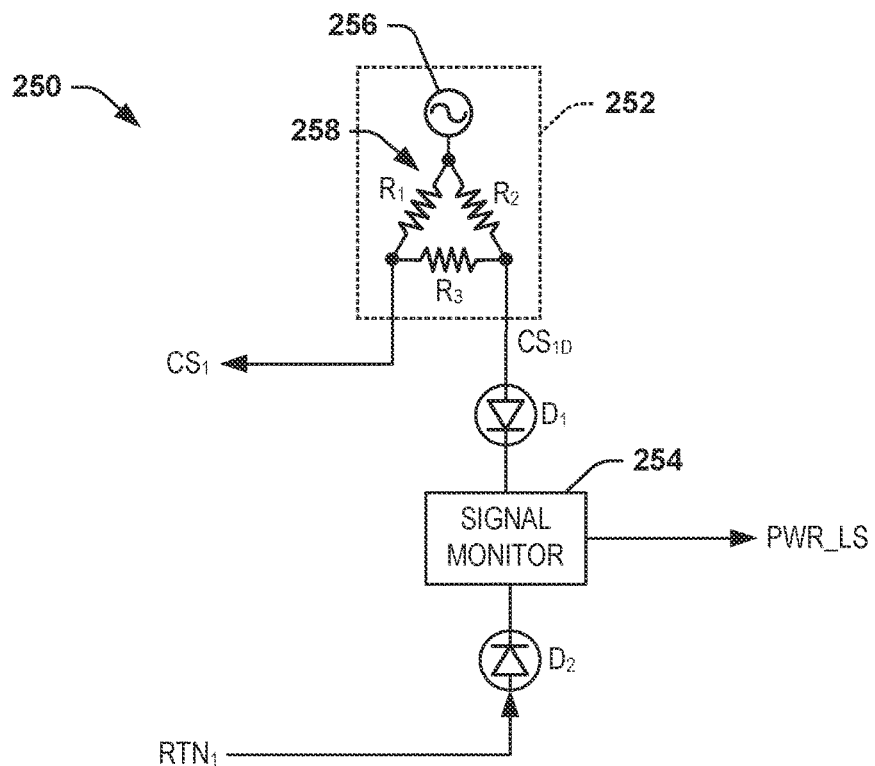
FIG. 7 illustrates an example of a transmission line measurement circuit.

FIG. 7 illustrates an example of a transmission line measurement circuit 250. The transmission line measurement circuit 250 can correspond to the transmission line measurement circuit 68 in the example of FIG. 2. Therefore, reference is to be made to the examples of FIGS. 2-6 in the following description of the example of FIG. 7.

As described previously, the transmission line measurement circuit 250 is configured to determine a signal loss between the user communication system and the antenna circuit 50 through the transmission line cables 62 and 64. In the example of FIG. 7, the transmission line measurement circuit 250 includes a calibration signal generator 252 and a signal monitor 254. The calibration signal generator 252 includes an RF signal source 256 that is configured to generate a calibration signal that can correspond to the first calibration signal $CS_1$. As an example, the first calibration signal CSI can correspond to a dummy RF signal (e.g., a sinusoidal signal) having a predefined frequency. In the example of FIG. 7, the calibration signal generator 252 includes a resistive network 258 that includes a first resistor $R_1$ and a second resistor $R_2$ that are each connected to the RF signal source 256 and to a third resistor $R_3$ opposite the RF signal source 256 and interconnecting the first and second resistors $R_1$ and $R_2$. The resistive network 258 can thus provide a divided version of the first calibration signal $CS_1$ that can be provided to the first transmission line cable 62 (e.g., via the switch $SW_1$) in the calibration mode. The transmission line measurement circuit 250 can thus transmit the calibration signal $CS_1$ to the user communication system 12 via the transmission line cable 62.

As described previously, the user communication system 12 can be configured to retransmit the calibration signal $CS_1$ back to the antenna system 50 from the user communication system 12 as respective return signal $RTN_1$ on the transmission line cable 64, such as described in the example of FIG. 4 during the calibration procedure. In the example of FIG. 7, the return signal $RTN_1$ is provided to the signal monitor 254 via a diode $D_1$. The signal monitor 254 is also configured to receive a divided version of the first calibration signal $CS_1$, demonstrated as a signal $CS_{1D}$, via a diode $D_2$. Therefore, as an example, the signal monitor 254 can be configured to measure a power of each of the return signal $RTN_1$ and the signal $CS_{1D}$. As a result, the signal monitor 254 can calculate a power ratio between the return signal $RTN_1$ and the signal $CS_{1D}$. Accordingly, the signal monitor 254 can determine the signal loss exhibited by the transmission line cables 62 and 64 based on the power ratio between the return signal $RTN_1$ and the signal $CS_{1D}$. The power monitor 254 can thus provide the calculated signal loss, demonstrated as a signal PWR_LS, to the memory 74.

While the transmission line measurement circuit 250 is configured to provide the calibration operation demonstrated in the example of FIG. 4, it is to be understood that the transmission line measurement circuit 250 is not limited to the example of FIG. 7. For example, the transmission line measurement circuit 250 can be arranged in a manner to facilitate the calibration signal $CS_1$ and the return signal $RTN_1$ or the calibration signal $CS_2$ and the return signal $RTN_2$ to be propagated along a given one of the transmission line cables 62 and 64, such as described in the example of FIG. 3.

Referring back to the example of FIG. 2, the antenna circuit 52 also includes a controller 76. In response to the determining the signal loss, the transmission line measurement circuit 68 can provide the determined signal loss, demonstrated in the example of FIG. 2 as "SM", to the controller 76 (e.g., from the memory). In response to the determined signal loss SM, the controller 76 can be configured to adjust an amplitude of at least one of the transmit signals transmitted from the antenna system 50 and the receive signals received at the antenna system 50 based on the determined signal loss. As an example, the controller 76 can include a processor that is configured to determine the appropriate adjustments to the amplitude of each of the respective transmit and receive signals based on the determined signal loss SM. While the controller 76 is described as including a processor, the term "processor" can be used to describe other types of processing devices, such as a field-programmable gate array (FPGA), an application specific integrated circuit (ASIC), or other type of processing device.

In the example of FIG. 2, the antenna circuit 52 includes a first amplitude adjustment circuit 78 that is provided in the first signal path 54 and a second amplitude adjustment circuit 80 that is provided in the second signal path 56. As an example, the amplitude adjustment circuits 78 and 80 can each include at least one variable circuit element (VCE) in the respective signal paths 54 and 56. For example, the VCEs can be configured as variable attenuators, variable gain amplifiers, and/or fixed gain amplifiers. In the example of FIG. 2, the controller 76 is configured to provide control signals, demonstrated as "$AT_1$" and "$AT_2$", respectively, to the amplitude adjustment circuits 78 and 80 based on the determined signal loss SM, as well as based on whether the signal paths 54 and/or 56 are in the transmit mode or the receive mode.

For example, the communication system 10 can be configured to operate based on a predetermined communication standard that can dictate a predetermined maximum effective isotropic radiated power (EIRP), such as +23 dBm for the transmit signals. Therefore, the controller 76 provides the control signals $AT_1$ and $AT_2$ to the respective amplitude adjustment circuits 78 and 80 in the transmit mode to attenuate the transmit signals down to less than the predetermined maximum EIRP. For example, the antenna arrays 58 and 60 can be designed with sufficiently high gain to provide the transmit signals at a power level that is greater than the predetermined maximum EIRP to overcome power losses of the transmission line cables 62 and 64 regardless of the length of the transmission line cables 62 and 64, such that the transmit signals can be attenuated down to approximately the predetermined maximum EIRP. Additionally or alternatively, the signal paths 54 and 56 can include sufficient power amplification in the transmit mode, as described in greater detail herein, to overcome power losses of the transmission line cables 62 and 64 regardless of the length of the transmission line cables 62 and 64, such that the transmit signals can be attenuated down to approximately the predetermined maximum EIRP. Similarly, the controller 76 provides the control signals $AT_1$ and $AT_2$ to the respective amplitude adjustment circuits 78 and 80 in the receive mode to attenuate the receive signals down to less than an acceptable operational level (e.g., a maximum saturation power associated with the antenna circuit 50 and/or the user communication system 12). Therefore, the antenna system 50 can be installed in a manner that is substantially agnostic of the length and/or loss characteristics of the transmission line cables 62 and 64 based on the calibration operation to determine the signal loss of the transmission line cables 62 and 64.

As described previously, the communication system 10 can operate based on a TDD communication standard, such that the transmit signals and the receive signals can be interleaved with each other on a given signal path between the user communication system 12 and the antenna arrays 58 and 60. In addition, as described previously, the signal paths 54 and 56 of the antenna circuit 52 can operate in either a transmit mode or a receive mode corresponding to transmission of the transmit signals or receipt of the receive signals in the TDD manner along the respective signal paths 54 and 56. In the example of FIG. 2, the antenna circuit 52 also includes a first transmit detection circuit 90 associated with the first signal path 54 and a second transmit detection circuit 92 associated with the second signal path 56. The transmit detection circuits 90 and 92 can be configured to measure power on the respective signal paths 54 and 56 to determine if the user communication system 12 is transmitting a transmit signal.

For example, the transmit detection circuits 90 and 92 can each include a bidirectional coupler with a terminated load to determine if the power on the respective one of the signal paths 54 and 56 is greater than a predetermined threshold to determine if the user communication system 12 is transmitting a transmit signal. In the example of FIG. 2, the transmit detection circuits 90 and 92 are configured to generate mode signals $TX_1$ and $TX_2$ that are provided to the controller 76, such as to indicate that the respective one of the signal paths 54 and 56 is in the transmit mode. Therefore, in response to the transmit detection circuits 90 and 92 determining if the user communication system 12 is transmitting a transmit signal, the controller 76 can switch the respective signal paths 54 and 56 from the receive mode as a default mode to a transmit mode to facilitate transmission of the transmit signal from the antenna system 50 via the antenna arrays 58 and 60. Similarly, in response to the transmit detection circuits 90 and 92 detecting a decrease in the power of the signal path (e.g., less than the predetermined threshold), the controller 76 can switch the respective signal paths 54 and 56 back to the receive mode from the transmit mode (e.g., upon expiration of a timer).

As described previously, the controller 76 can be configured to adjust the respective control signal(s) $AT_1$ and $AT_2$ based on the indication of the transmit mode or the receive mode of the respective one of the signal paths 54 and 56, such as based on the respective mode signals $TX_1$ and $TX_2$. Therefore, the amplitude of the transmit and receive signals can be adjusted (e.g., attenuated) based on whether the respective signal path 54 or 56 is in the transmit mode or the receive mode. As another example, as described previously, the amplitude adjustment circuits 78 and 80 can switch between a transmit mode signal path and a receive mode signal path for each of the amplitude adjustment circuits 78 and 80 via switches. Therefore, the controller 76 can also include a switch controller 94 that is configured to control the switches of the amplitude adjustment circuits 78 and 80.

As an example, the switch controller 94 can be configured to generate mode signals $MD_1$ and $MD_2$, respectively, to control the mode of the respective one of the signal paths 54 and 56. For example, the amplitude adjustment circuit 78 can be controlled by the first switching signal $MD_1$ and the amplitude adjustment circuit 80 can be controlled by the second switching signal $MD_2$. In response to one of the transmit detection circuits 90 and 92 determining that the user communication system 12 is transmitting a transmit signal along the respective one of the signal paths 54 and 56, the respective one of the transmit detection circuits 90 and 92 commands the controller 76 (e.g., via the mode signals $TX_1$ and $TX_2$) to provide the respective one of the switching signals $MD_1$ and $MD_2$ to the respective one of the amplitude adjustment circuits 78 and 80. In response to the respective one of the switching signals $MD_1$ and $MD_2$, the respective amplitude adjustment circuit 78 and 80 can activate at least one switch to switch the respective amplitude adjustment circuit 78 or 80 from the default receive mode to the transmit mode to facilitate transmission of the transmit signal along the respective signal path 54 and 56 and from the respective antenna array 58 and 60.

Figure 8:
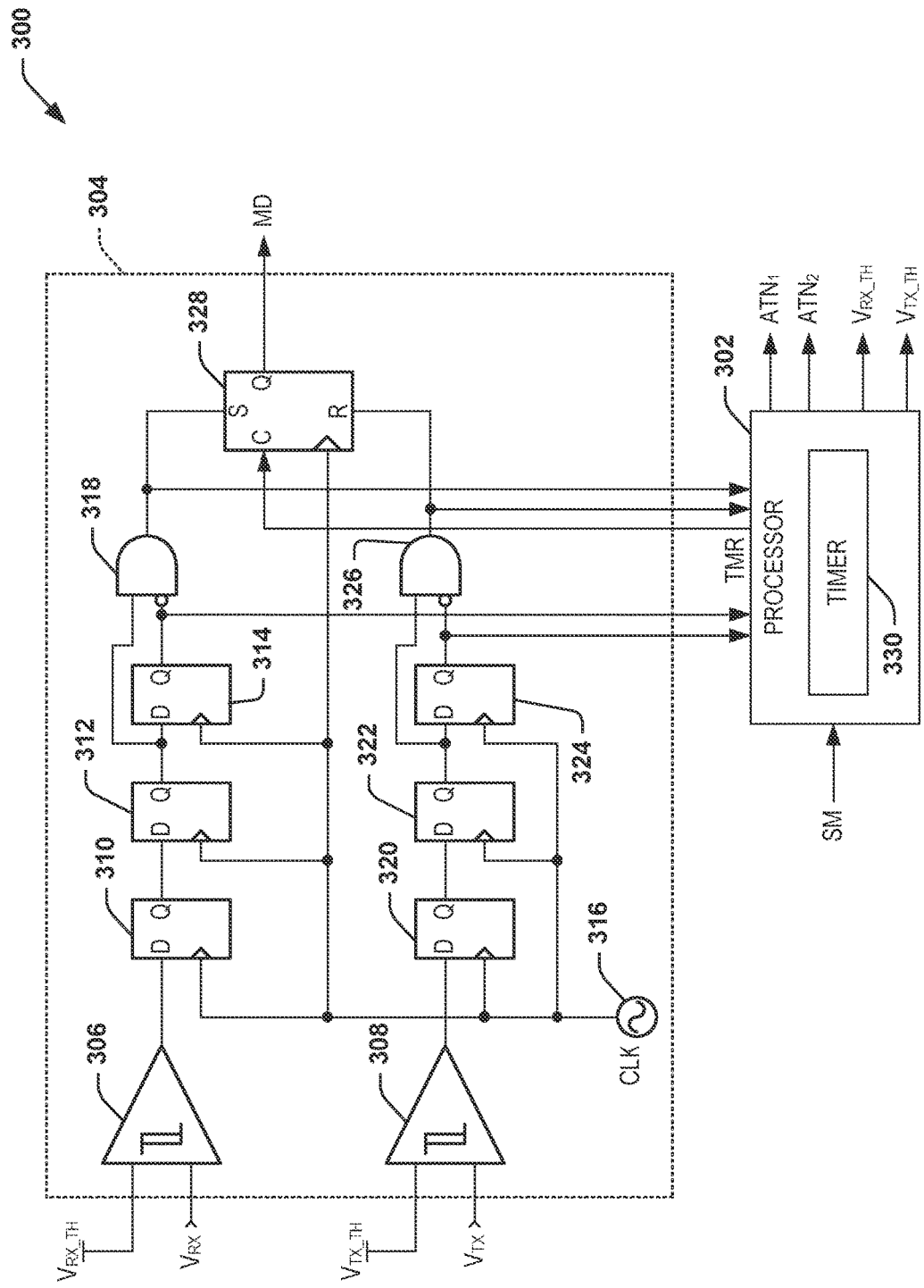
FIG. 8 illustrates an example of a controller.

FIG. 8 illustrates an example of a controller 300. The controller 300 can correspond to the controller 76 in the example of FIG. 2. Therefore, reference is to be made to the example of FIG. 2 in the following description of the example of FIG. 8.

The controller 300 includes a processor 302. For example, the processor 302 can communicate with or include the amplitude adjustment circuits 78 and 80. In the example of FIG. 8, the processor 302 receives the signal SM corresponding to the signal loss of the transmission line cables 62 and 64. Therefore, the processor 302 can be configured to calculate the appropriate amount of amplification (e.g., attenuation) to provide to the amplitude adjustment circuits 78 and 80, such as to provide the appropriate attenuation to the signal paths 54 and/or 56 based on the respective mode (e.g., transmit mode or receive mode). In the example of FIG. 7, the processor 302 is demonstrated as generating the control signals $AT_1$ and $AT_2$ that are provided to the amplitude adjustment circuits 78 and 80, such as to provide the appropriate attenuation to the signal paths 54 and/or 56 based on the respective mode.

As described previously, the controller 76 in the example of FIG. 2 can include the switching controller 94 to control the switches of the amplitude adjustment circuits 78 and 80. In the example of FIG. 8, the controller 300 can include a switching controller 304 that can provide a switching signal MD for one of the amplitude adjustment circuits 78 and 80.

Therefore, it is to be understood that the controller 300 can include a switching controller 304 for each of the signal paths 54 and 56. The switching controller 304 includes a first comparator 306 and a second comparator 308. The first comparator 306 is configured to compare a voltage $V_{RX}$ corresponding to an approximate power of the receive signals with a threshold voltage $V_{RX\_TH}$. Similarly, the second comparator 308 is configured to compare a voltage $V_{TX}$ corresponding to an approximate power of the transmit signals with a threshold voltage $V_{TX\_TH}$. As an example, the voltages $V_{RX}$ and $V_{TX}$ can correspond to the same voltage (e.g., corresponding to the signal power on a given one of the signal paths 54 and 56, as measured by the transmit detection system(s) 90 and 92. Therefore, the comparators 306 and 308 can be configured to provide an asserted output corresponding to the mode of the respective signal path 54 or 56.

The switching controller 304 includes a first sequence of D latches (e.g., flip-flops), demonstrated as 310, 312, and 314. The first D latch 310 receives the output of the first comparator 306 as an input, with the D latches 310, 312, and 314 being configured in a cascaded arrangement from output to input. Each of the D latches 310, 312, and 314 receives a clock signal CLK from an oscillator 316. The output of the second D latch 312 and the third D latch 314 are provided as inputs to an AND-gate 318, with the input received from the third D latch 314 being inverted. In a similar arrangement, the switching controller also includes a second sequence of D latches, demonstrated as 320, 322, and 324. The first D latch 320 receives the output of the second comparator 308 as an input, with the D latches 320, 322, and 324 being configured in a cascaded arrangement from output to input. Each of the D latches 320, 322, and 324 likewise receives the clock signal CLK. The output of the second D latch 322 and the third D latch 324 are provided as inputs to an AND-gate 326, with the input received from the third D latch 324 being inverted.

The output of the AND-gate 318 is provided as a set input to an SR latch 328, and the output of the AND-gate 326 is provided as a reset input to the SR latch 328. The SR latch 328 likewise the clock signal CLK, and is configured to generate the respective switching signal MD (e.g., one of the switching signals $MD_1$ and $MD_2$). Therefore, the SR latch 328 is configured to rapidly change the state of the switching signal MD in response to a change in amplitude of the voltages $V_{TX}$ and/or $V_{RX}$. For example, in response to a change of the amplitude of the voltages $V_{TX}$ and/or $V_{RX}$, the logic sequence of the D latches 310, 312, 314, 320, 322, and 324, the AND-gates 318 and 326, and the SR latch 328 can be configured to change the state of the switching signal MD in a time of approximately 10 microseconds or less, such as to satisfy the TDD communication standard.

The processor 302 can be configured to receive a plurality of inputs associated with the switching logic of the switching controller 304. In the example of FIG. 8, the processor 302 receives as inputs the output of the D latches 314 and 324, as well as the outputs of the AND-gates 318 and 326. For example, the processor 302 can be configured as a state machine to monitor the state of the signal path (e.g., the signal path 54 or 56), such that the inputs to the inputs to the processor 302 are configured to set flags and/or registers for operation of the antenna circuit 52. As another example, the oscillator 316 can be included in the processor 302, such that the processor 302 generates the clock signal CLK. Additionally, the processor 302 is demonstrated as generating the predetermined threshold voltages $V_{TX\_TH}$ and $V_{RX\_TH}$, which can be programmable via input to the processor 302, or can have fixed voltage amplitudes.

In the example of FIG. 8, the processor 302 includes timers 330 (e.g., one for each of the signal paths 54 and 56). As an example, the timers 330 can correspond to watchdog timers for controlling timing associated with the mode selection of the respective signal paths 54 and 56. For example, in response to the inputs provided to the processor 302 indicating that the mode is set for transmit mode for a given one of the signal path(s) 54 and 56, but the transmit power is less than the predetermine threshold (e.g., the voltage $V_{TX}$ is less than the predetermined threshold $V_{TX\_TH}$), the respective timer 330 can begin counting a predetermined timing threshold. As an example, in response to the respective timer 330 counting for a predetermined time duration (e.g., approximately one millisecond), the processor 302 can switch back to a default receive mode for the given signal path 54 or 56, such as to change the amplitude of the respective one of the control signals $AT_1$ and $AT_2$. Additionally, the processor 302 can assert an output to the SR latch 328 (e.g., to a "clear" input of the SR latch 328). Therefore, the SR latch 328 can reset to change the state of the switching signal MD to indicate switching the mode from the transmit mode back to the receive mode. As a result, the signal path(s) 54 and/or 56 can be returned to the default receive mode in response to the timed indication of no more transmit signals being transmitted from the user communication system 12.

Figure 9:
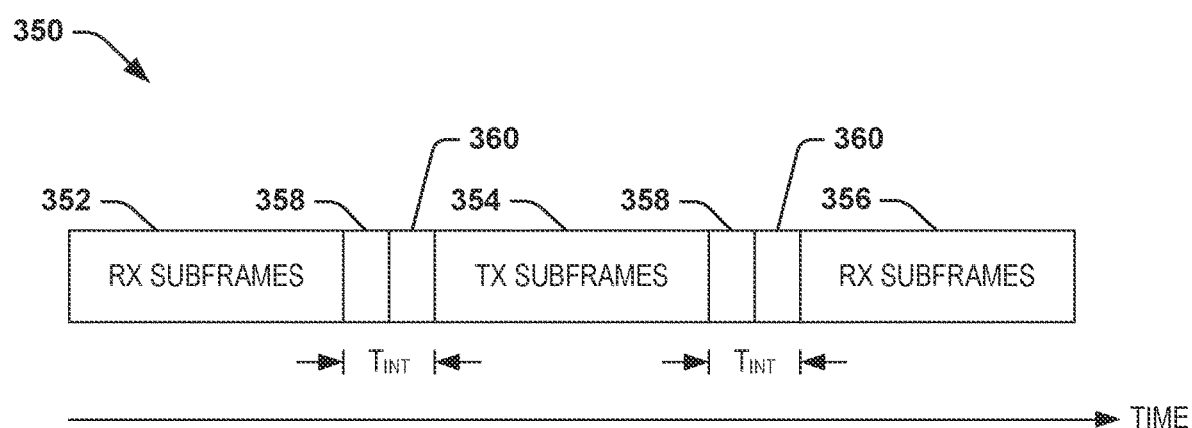
FIG. 9 illustrates an example of a TDD communication stream.

In order to satisfy a given TDD communication standard, the control signals $AT_1$ and $AT_2$ and the amplitude adjustment circuits 78 and 80 may be required to switch between the transmit mode and the receive mode as quickly as possible. FIG. 9 illustrates an example diagram 350 of a TDD communication stream. The TDD communication stream includes a first set of receive signal sub-frames, demonstrated at 352, a first set of transmit signal sub-frames, demonstrated at 354, and a second set of receive mode sub-frames 356. As an example, the TDD communication stream can continue thereafter with alternating sets of transmit signal sub-frames and receive signa sub-frames in a TDD manner. The transmit and receive signal sub-frames are demonstrated in the example of FIG. 9 as being demonstrated as a function of time. While each of the transmit and receive signal sub-frames are demonstrated as being approximately equal in time, it is to be understood that the transmit and receive signal sub-frames are not necessarily equal in length of time, and that the elements of the time domain demonstrated in the example of FIG. 9 are not necessarily illustrated to scale.

In the example of FIG. 9, between each of the sets of receive signal sub-frames (e.g., the receive signal sub-frames 352) and transmit signal sub-frames (e.g., the transmit signal sub-frames 354) is a time $T_{INT}$. The time $T_{INT}$ can, for example, correspond to a substantial maximum intermediate time between propagation of the receive signal sub-frames and the transmit signal sub-frames on a given signal path, such as between the user communication system 12, along a transmission line cable 62 or 64, along a respective signal path 54 or 56 in the antenna circuit 52, and a respective one of the antenna arrays 58 or 60, such as defined by the predetermined TDD communication standard.

In the example of FIG. 9, the time $T_{INT}$ between each of the transmit and receive signal sub-frames includes a first portion of time 358 and a second portion of time 360. The first portion of time 358 can correspond to a switching time (e.g., approximately 10 microseconds or less), such as to generate the appropriate switching signal(s) $MD_1$ and $MD_2$ and/or to activate the respective switches of the amplitude adjustment circuits 78 and 80. The second portion of time 360 can correspond to switch settling time (e.g., likewise approximately 10 microseconds or less), such as a time for the respective switches to settle to a saturation region and/or to dissipate parasitic effects (e.g., capacitance and/or inductance) of the circuit components of the switching controller 304 and/or the respective amplitude adjustment circuits 78 and 80. Therefore, the hardware-based logic circuit of the switching controller 304 can implement rapid state-changes of the switching signal(s) $MD_1$ and $MD_2$ to satisfy the rapid switching requirements dictated by the TDD communication standard.

FIGS. 10-15 demonstrate examples of amplitude adjustment circuits. The example of FIG. 10 demonstrates an amplitude adjustment circuit 370, the example of FIG. 11 demonstrates an amplitude adjustment circuit 400, the example of FIG. 12 demonstrates an amplitude adjustment circuit 450, the example of FIG. 13 demonstrates an amplitude adjustment circuit 500, the example of FIG. 14 demonstrates an amplitude adjustment circuit 550, and the example of FIG. 15 demonstrates an amplitude adjustment circuit 600. Any of the amplitude adjustment circuits 370, 400, 450, 500, 550, and 600 can correspond to the amplitude adjustment circuits 78 and 80 in the example of FIG. 2. Therefore, reference is to be made to the example of FIG. 2 in the following description of the examples of FIGS. 10-14. Additionally, the amplitude adjustment circuits 370, 400, 450, 500, 550, and 600 are not limited to the examples demonstrated in the examples of FIGS. 10-14. For example, the amplitude adjustment circuits 370, 400, 450, 500, 550, and 600 can include filters, such as low-noise filters, bandpass filters, and the like that can be arranged in the respective transmit path, receive path, or both. Furthermore, the switches described in the amplitude adjustment circuits 400, 450, 500, 550, and 600 can be implemented as transistor devices, such as to provide very rapid switching times between the transmit mode and the receive mode.

Figure 10:
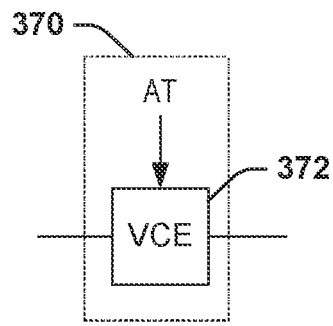
FIG. 10 illustrates an example of an amplitude adjustment circuit.

In the example of FIG. 10, the amplitude adjustment circuit 370 includes a VCE 372 in the signal path (e.g., the signal path 54 or 56). The VCE 372 is demonstrated as being controlled by a control signal AT (e.g., one of the control signals $AT_1$ or $AT_2$). For example, the VCE 372 can be configured as a variable attenuator that is controlled by the controller 76 to provide attenuation of the transmit signals in the transmit mode and to provide attenuation of the receive signals in the receive mode (e.g., based on a respective one of the mode signals $TX_1$ or $TX_2$). Therefore, the mode of the amplitude adjustment circuit 370 is controlled by the amount of adjustment (e.g., attenuation) provided by the control signal AT in each of the transmit mode and the receive mode.

Figure 11:
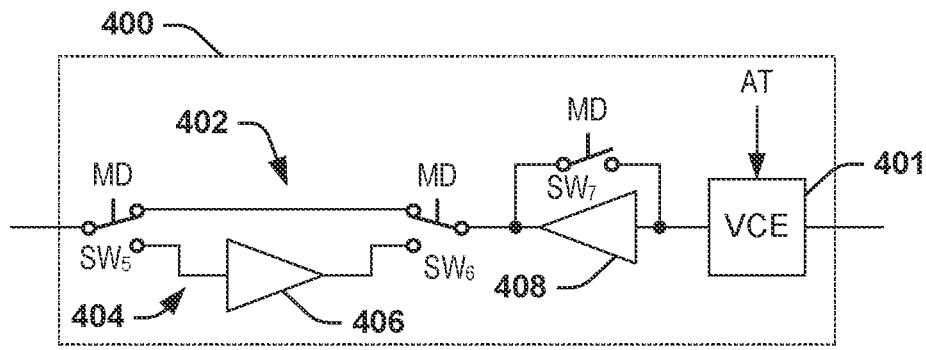
FIG. 11 illustrates another example of an amplitude adjustment circuit.

In the example of FIG. 11, the amplitude adjustment circuit 400 includes a VCE 401 in the signal path (e.g., the signal path 54 or 56). The VCE 401 is demonstrated as being controlled by a control signal AT (e.g., one of the control signals $AT_1$ or $AT_2$). For example, the VCE 401 can be configured as a variable attenuator that is controlled by the controller 76 to provide attenuation of the transmit signals in the transmit mode and to provide attenuation of the receive signals in the receive mode (e.g., based on a respective one of the mode signals $TX_1$ or $TX_2$). The amplitude adjustment circuit 400 also includes first switch $SW_5$, a second switch $SW_6$, and a third switch $SW_7$ that are each controlled by the switching signal MD. The switches $SW_5$, $SW_6$, and $SW_7$ are demonstrated in a default state corresponding to the default state of the receive mode. The first and second switches $SW_5$ and $SW_6$ are each demonstrated in the example of FIG. 11 as single-pole double-throw switches that select between a first signal path, demonstrated at 402, and a second signal path, demonstrated at 404. In the example of FIG. 11, the first signal path 402 can correspond to the receive mode and the second signal path 404 can correspond to the transmit mode. The second signal path 404 includes a power amplifier 406 that is configured to amplify the transmit signal in the transmit mode. Additionally, the amplitude adjustment circuit 400 includes a low-noise amplifier (LNA) 408 that is arranged in parallel with the third switch $SW_7$, arranged as a single-pole single-throw switch. Therefore, in the receive mode, the receive signal is amplified by the LNA 408, and in the transmit mode, the transmit signal is provided in a bypass short-circuit through the closed switch $SW_7$.

Figure 12:
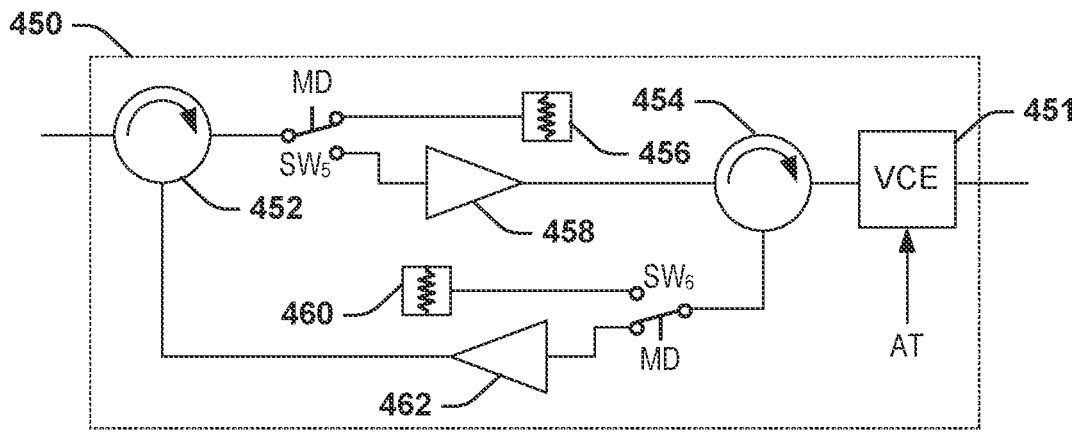
FIG. 12 illustrates another example of an amplitude adjustment circuit.

In the example of FIG. 12, the amplitude adjustment circuit 450 includes a VCE 451 in the signal path (e.g., the signal path 54 or 56). The VCE 451 is demonstrated as being controlled by a control signal AT (e.g., one of the control signals $AT_1$ or $AT_2$). For example, the VCE 451 can be configured as a variable attenuator that is controlled by the controller 76 to provide attenuation of the transmit signals in the transmit mode and to provide attenuation of the receive signals in the receive mode (e.g., based on a respective one of the mode signals $TX_1$ or $TX_2$). The amplitude adjustment circuit 450 also includes a first circulator 452, a second circulator 454, a first switch $SW_5$, and a second switch $SW_6$ that are each controlled by the switching signal MD. The switches $SW_5$ and $SW_6$ are demonstrated in a default state corresponding to the default state of the receive mode. The first and second switches $SW_5$ and $SW_6$ are each demonstrated in the example of FIG. 11 as single-pole double-throw switches. The first circulator 452 is demonstrated as a "clockwise" circulator, such that the transmit signal is provided to the first switch $SW_5$. The first switch $SW_5$ selects between an attenuator 456 in the receive mode and a power amplifier 458 in the transmit mode, and thus is output from the amplitude adjustment circuit 450 via the second circulator 454 that is also arranged as a "clockwise" circulator. The second circulator 454 also provides the receive signal to the second switch $SW_6$. The second switch $SW_6$ selects between an attenuator 460 in the transmit mode and an LNA 462 in the receive mode, and thus is output from the amplitude adjustment circuit 450 via the first circulator 452.

Figure 13:
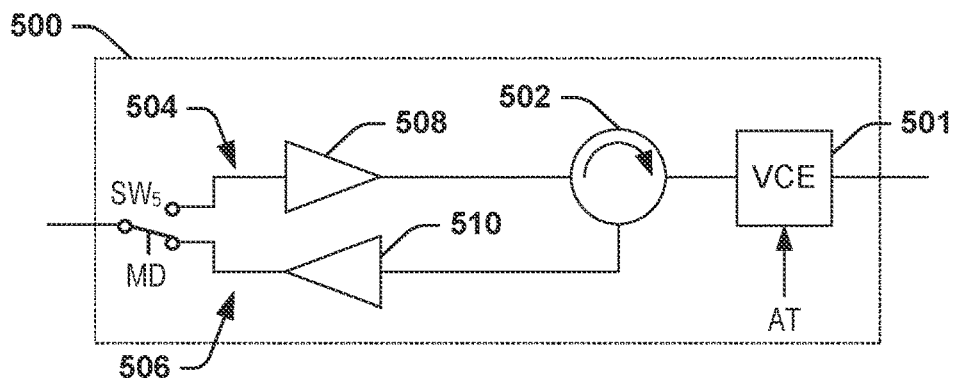
FIG. 13 illustrates another example of an amplitude adjustment circuit.

In the example of FIG. 13, the amplitude adjustment circuit 500 includes a VCE 501 in the signal path (e.g., the signal path 54 or 56). The VCE 501 is demonstrated as being controlled by a control signal AT (e.g., one of the control signals $AT_1$ or $AT_2$). For example, the VCE 501 can be configured as a variable attenuator that is controlled by the controller 76 to provide attenuation of the transmit signals in the transmit mode and to provide attenuation of the receive signals in the receive mode (e.g., based on a respective one of the mode signals $TX_1$ or $TX_2$). The amplitude adjustment circuit 500 also includes a switch $SW_5$ and a circulator 502. The switch $SW_5$ is arranged as a single-pole double-throw switch controlled by the switching signal MD, and is demonstrated in a default state corresponding to the default state of the receive mode. The switch $SW_5$ selects between a first signal path, demonstrated at 504, and a second signal path, demonstrated at 506. In the example of FIG. 13, the first signal path 504 can correspond to the transmit mode and the second signal path 506 can correspond to the receive mode. The first signal path 504 includes a power amplifier 508 that is configured to amplify the transmit signal in the transmit mode, and thus is output from the amplitude adjustment circuit 500 via the circulator 502 that is also arranged as a "clockwise" circulator. The second signal path 506 includes an LNA 510, such that the circulator 502 provides the receive signal on the second signal path 506 to be amplified by the LNA 510 and output from the amplitude adjustment circuit 500 via the switch $SW_5$ in the receive mode.

Figure 14:
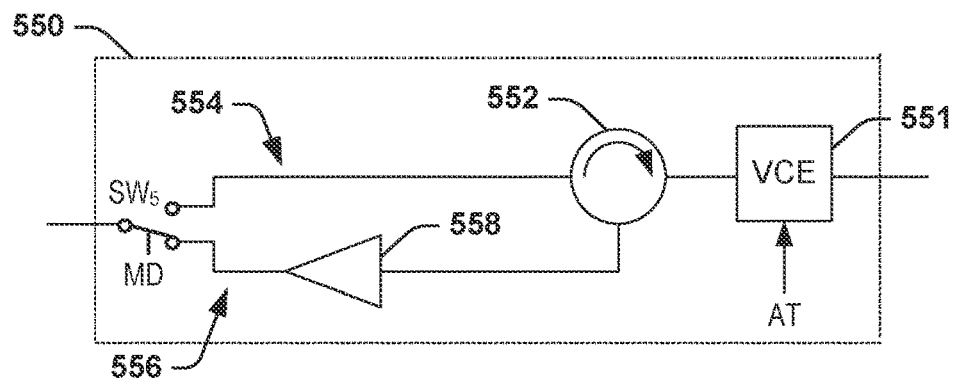
FIG. 14 illustrates another example of an amplitude adjustment circuit.

In the example of FIG. 14, the amplitude adjustment circuit 550 includes a VCE 551 in the signal path (e.g., the signal path 54 or 56). The VCE 551 is demonstrated as being controlled by a control signal AT (e.g., one of the control signals $AT_1$ or $AT_2$). For example, the VCE 551 can be configured as a variable attenuator that is controlled by the controller 76 to provide attenuation of the transmit signals in the transmit mode and to provide attenuation of the receive signals in the receive mode (e.g., based on a respective one of the mode signals $TX_1$ or $TX_2$). The amplitude adjustment circuit 550 also includes a switch $SW_5$ and a circulator 552. The switch $SW_5$ is arranged as a single-pole double-throw switch controlled by the switching signal MD, and is demonstrated in a default state corresponding to the default state of the receive mode. The switch $SW_5$ selects between a first signal path, demonstrated at 554, and a second signal path, demonstrated at 556. In the example of FIG. 14, the first signal path 554 can correspond to the transmit mode and the second signal path 556 can correspond to the receive mode. The first signal path 554 is demonstrated as a bypass short-circuit to output the transmit signal from the amplitude adjustment circuit 550 via the circulator 552 that is also arranged as a "clockwise" circulator. The second signal path 556 includes an LNA 558, such that the circulator 552 provides the receive signal on the second signal path 556 to be amplified by the LNA 558 and output from the amplitude adjustment circuit 550 via the switch $SW_5$ in the receive mode.

Figure 15:
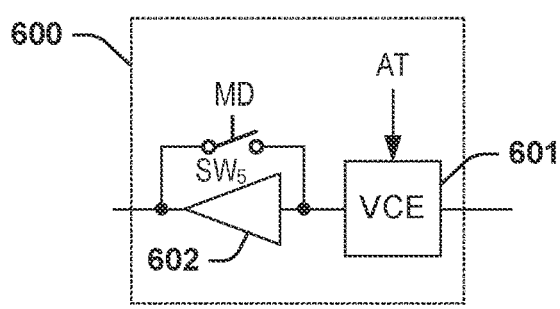
FIG. 15 illustrates another example of an amplitude adjustment circuit.

In the example of FIG. 15, the amplitude adjustment circuit 600 includes a VCE 601 in the signal path (e.g., the signal path 54 or 56). The VCE 601 is demonstrated as being controlled by a control signal AT (e.g., one of the control signals $AT_1$ or $AT_2$). For example, the VCE 601 can be configured as a variable attenuator that is controlled by the controller 76 to provide attenuation of the transmit signals in the transmit mode and to provide attenuation of the receive signals in the receive mode (e.g., based on a respective one of the mode signals $TX_1$ or $TX_2$). The amplitude adjustment circuit 600 also includes a switch $SW_5$ controlled by the switching signal MD. The switch $SW_5$ is demonstrated as a single-pole single-throw switch in a default state corresponding to the default state of the receive mode. The amplitude adjustment circuit 600 includes an LNA 602 that is arranged in parallel with the switch $SW_5$. Therefore, in the receive mode, the receive signal is amplified by the LNA 602, and in the transmit mode, the transmit signal is provided in a bypass short-circuit through the closed switch $SW_5$.

The examples of FIGS. 10, 14, and 15 do not include power amplifiers to provide amplification of the transmit signals in the transmit mode. As described previously, the signal paths 54 and 56 can include sufficient power amplification in the transmit mode, such as provided in the examples of FIGS. 11-13, to overcome power losses of the transmission line cables 62 and 64 regardless of the length of the transmission line cables 62 and 64 (e.g., to attenuate the transmit signals down to approximately the predetermined maximum EIRP). As another example, the amplitude adjustment circuits 370, 550, and 600 in the examples of FIGS. 10, 14, and 15, respectively, can be implemented when the user communication system 12 includes sufficient power amplification of the transmit signals that power amplifiers are not necessary in the transmit signal paths. Additionally or alternatively, the antenna arrays 58 and 60 can be designed with sufficiently high gain that power amplification of the transmit signals is not necessary in the transmit signal paths to provide feasibility of the amplitude adjustment circuits 550 and 600.

As another example, the amplitude adjustment circuits 400, 450, and 500 can be implemented for installation of an antenna system 50 in a manner that is completely agnostic of the user communication system 12. For example, during the calibration procedure, in addition to measuring the signal loss of the transmission line cables 62 and 64, the antenna system 50 can measure an output power of the transmit signals provided from the user communication system 12 (e.g., via the transmit detection circuits 90 and 92, such as relative to a plurality of thresholds). Therefore, in response to determining the output power of the user communication system 12, the antenna circuit 52 can properly attenuate the transmit signals in the transmit mode down to approximately the predetermined maximum EIRP.

As a result, the switching controller 304 can implement state changes of the switching signal MD in response to changes of amplitude of the voltages $V_{TX}$ and/or $V_{RX}$, such as in response to the transmit detection circuit(s) 90 and 92 detecting changes in power on the respective signal path(s) 54 and 56. Accordingly, the switching signals $MD_1$ and $MD_2$ can provide sufficiently rapid switching to satisfy the maximum switching times (e.g., the first portion of time 558 in the example of FIG. 9) to comply with the TDD communication standard. As a result, the antenna system 50 can operate to facilitate the bidirectional TDD communications between transmit and receive signals, such as without requiring communication or signal transfer from the user communication system 12. Therefore, the antenna system 50 can be installed in a simplistic manner that is largely independent of the operation of the user communication system 12. Additionally, the antenna system 14 can be installed in a manner that is agnostic of the length of the transmission line cable(s) 62 and 64 interconnecting the antenna system 50 and the user communication system 12. Accordingly, the antenna system 50 can be simplistically installed to efficiently facilitate wireless communication between the user communication system 12 and a network hub (e.g., a base station).

Figure 16:
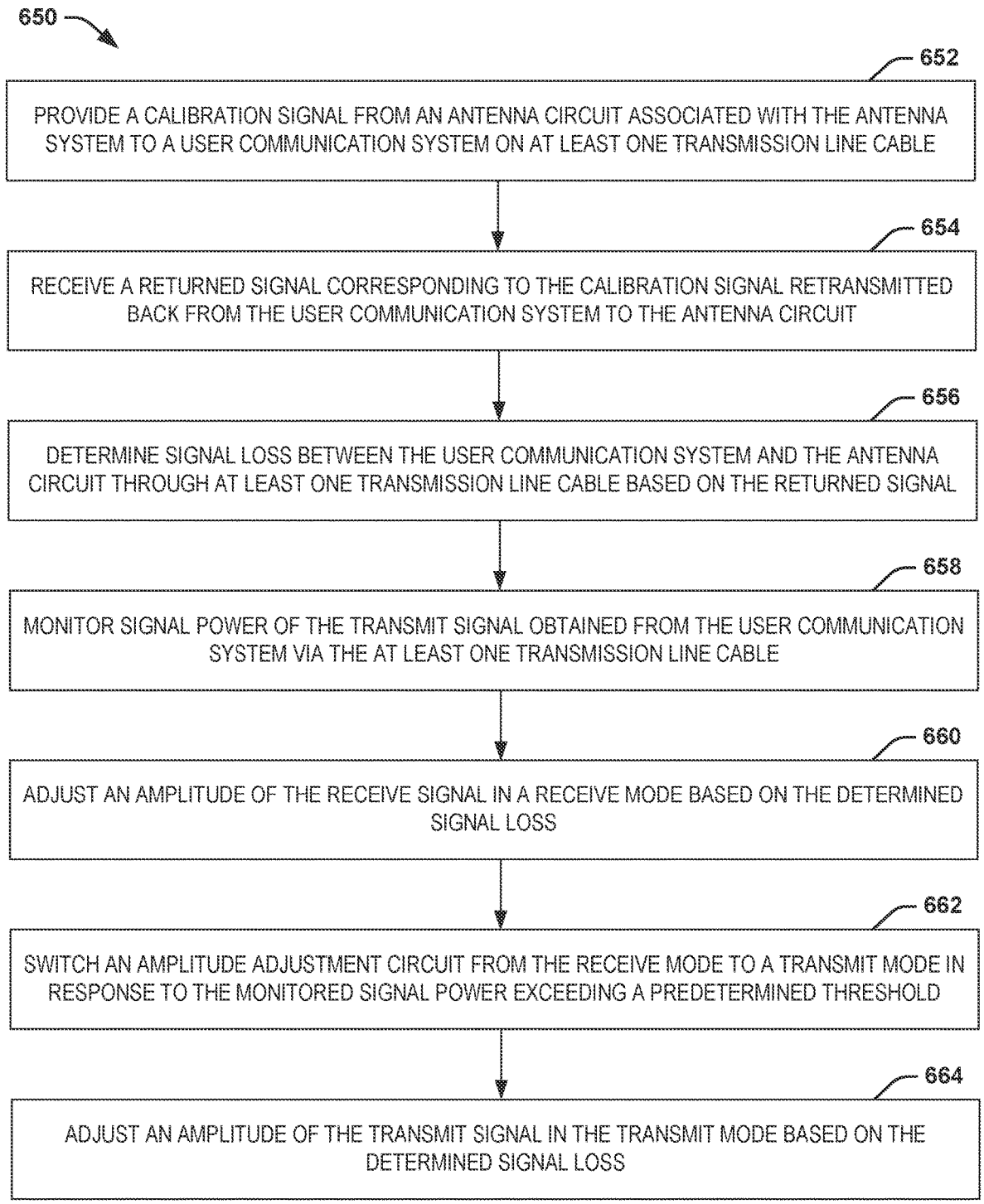
FIG. 16 illustrates an example of a method for communicating at least one of a transmit signal and a receive signal via a time-division duplex (TDD) antenna system comprising an antenna.

In view of the foregoing structural and functional features described above, a methodology in accordance with various aspects of the present invention will be better appreciated with reference to FIG. 16. While, for purposes of simplicity of explanation, the methodology of FIG. 16 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 16 illustrates an example of a method 650 for communicating at least one of a transmit signal and a receive signal via a TDD antenna system (e.g., the antenna system 14) comprising an antenna (e.g., the antenna array(s) 18). At 652, a calibration signal (e.g., the calibration signal(s) $CS_1$ and/or $CS_2$) is provided from an antenna circuit (e.g., the antenna circuit 20) associated with the antenna system to a user communication system (e.g., the user communication system 12) on at least one transmission line cable (e.g., the transmission line cable(s) 16). At 654, a returned signal (e.g., the return signal(s) $RTN_1$ and $RTN_2$) corresponding to the calibration signal retransmitted back from the user communication system is received at the antenna circuit. At 656, signal loss between the user communication system and the antenna circuit through at least one transmission line cable is determined (e.g., via the transmission line measurement circuit 22) based on the returned signal. At 658, signal power of the transmit signal obtained from the user communication system via the at least one transmission line cable is monitored (e.g., via the transmit detection circuit 26). At 660, an amplitude of the receive signal is adjusted in a receive mode based on the determined signal loss. At 662, an amplitude adjustment circuit (e.g., the amplitude adjustment circuit 24) is switched from the receive mode to a transmit mode (e.g., via the controller 28) in response to the monitored signal power exceeding a predetermined threshold. At 664, an amplitude of the transmit signal is adjusted in the transmit mode based on the determined signal loss.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A self-synchronizing time-division duplex (TDD) antenna system comprising:
    an antenna configured to communicate a transmit signal and a receive signal;
    a calibration circuit; and
    an antenna circuit coupled to the antenna and to a user communication system via at least one transmission line cable, the antenna circuit comprising:
        a transmission line measurement circuit configured to generate a calibration signal and to determine signal loss between the user communication system and the antenna circuit through the at least one transmission line cable based on a return signal compared to the calibration signal;
        an amplitude adjustment circuit configured to adjust amplitude of at least one of the transmit and receive signals based on the determined signal loss;
        a transmit detection circuit configured to monitor signal power of the transmit signal obtained from the user communication system via the at least one transmission line cable; and
        a controller configured to switch the amplitude adjustment circuit from a receive mode to a transmit mode in response to the monitored signal power exceeding a predetermined threshold, wherein in the receive mode the amplitude adjustment circuit applies a receive amplitude adjustment along a signal path to the receive signal, and in the transmit mode the amplitude adjustment circuit applies a transmit amplitude adjustment along the signal path to the transmit signal;
    wherein the calibration circuit comprises:
        a first switch in communication with a first transmission line cable of the at least one transmission line cable;
        a second switch in communication with a second transmission line cable of the at least one transmission line cable;
        wherein during a normal operation mode, the first switch connects the first transmission line cable to the signal path to facilitate propagation of the transmit and receive signals between the user communication system and the antenna via the first and second transmission line cable,
        wherein during a calibration mode, the first and second switches are switched to be disconnected from the signal path and to provide the calibration signal to the first transmission line cable which is retransmitted back to the antenna circuit as the return signal along the second transmission line cable to determine the signal loss of the first and second transmission line cables, and
        an extraction circuit for receiving DC power from the user communication system via at least one of the first and second transmission line cables and providing the DC power to the antenna circuit.

2. The system of claim 1, wherein in the receive mode the amplitude adjustment circuit adjusts the amplitude of the receive signal obtained via the antenna and provides the adjusted receive signal to the user communication system via the at least one transmission cable, and in the transmit mode the amplitude adjustment circuit adjusts the amplitude of the transmit signal.

3. The system of claim 1, wherein the transmission line measurement circuit comprises:
    a calibration signal generator configured to provide a calibration signal on the at least one transmission line cable from the antenna circuit to the user communication system, the calibration signal being retransmitted back from the user communication system to the antenna circuit as a returned signal; and
    a signal monitor configured to detect a characteristic of the returned signal and to determine the signal loss based on the characteristic of the returned signal.

4. The system of claim 3, wherein the calibration signal generator provides the calibration signal in response to a calibration command.

5. The system of claim 3, wherein the signal monitor is configured to measure a first power associated with the calibration signal provided on the at least one transmission line cable and to measure a second power associated with the returned signal on the at least one transmission line cable to determine the signal loss as a ratio of the first power and the second power.

6. The system of claim 5, wherein the at least one transmission line cable comprises a first transmission line cable and a second transmission line cable, wherein the signal monitor is configured to measure the first power associated with the calibration signal provided on the first transmission line cable and to measure the second power associated with the returned signal received on the second transmission line cable.

7. The system of claim 1, wherein the antenna system comprises an extraction circuit configured to receive DC power from the user communication system via the at least one transmission line cable.

8. The system of claim 1, wherein the controller is further configured to switch from the transmit mode to the receive mode in response to the monitored signal power being below the predetermined threshold.

9. The system of claim 1, wherein:
the transmit signal is a first transmit signal and the receive signal is a first receive signal;
the antenna comprises a first antenna array to communicate the first transmit signal and the first receive signal, and further comprises a second antenna array to communicate a second transmit signal and a second receive signal;
the signal path of the amplitude adjustment circuit is a first signal path; and
in the receive mode the amplitude adjustment circuit applies the receive amplitude adjustment along a second signal path to the second receive signal, and in the transmit mode the amplitude adjustment circuit applies the transmit amplitude adjustment along the second signal path to the second transmit signal.

10. The system of claim 9, wherein:
the antenna circuit communicates the first receive signal and the first transmit signal with the user communication system via the first transmission line cable, and communicates the second receive signal and the second transmit signal with the user communication system via the second transmission line cable.

11. The system of claim 1, wherein the antenna circuit further comprises memory to store the determined signal loss.

12. The system of claim 1, wherein the transmit detection circuit comprises a directional coupler and power detector to monitor the signal power of the transmit signal.

13. A method for communicating at least one of a transmit signal and a receive signal via a time-division duplex (TDD) antenna system comprising an antenna configured to communicate a transmit signal and a receive signal, the method comprising:
during a normal operation mode, connecting via a first switch of a calibration circuit a first transmission line cable to a signal path, and connecting via a second switch of the calibration circuit a second transmission line cable to the signal path to facilitate propagation of the transmit and receive signals between a user communication system and the antenna via the first and second transmission line cables,
during a calibration mode, disconnecting the first and second transmission line cables, using the respective first and second switches, from the signal path, and providing a calibration signal to the first transmission line cable which is retransmitted back to the antenna system as a return signal along the second transmission line cable to determine a signal loss of the first and second transmission line cables based on the return signal in comparison to the calibration signal, and
receiving DC power, at an extraction circuit, from the user communication system via at least one of the first and second transmission line cables and providing the DC power to the antenna circuit,
monitoring signal power of the first transmit signal and the second transmit signal obtained from the user communication system via the respective first and second transmission line cables;
adjusting, with respective first and second amplitude adjustment circuits in the antenna circuit, an amplitude of the first and second receive signals in a receive mode based on the determined signal loss;
switching the respective first and second amplitude adjustment circuits from the receive mode to a transmit mode in response to the monitored signal power exceeding a predetermined threshold;
adjusting an amplitude of the first and second transmit signals in the transmit mode based on the determined signal loss; and
receiving DC power at an extraction circuit from the user communication system via at least one of the first and second transmission line cables and providing the DC power to the antenna circuit.

14. The method of claim 13, wherein determining signal loss comprises:
detecting a characteristic of the returned signal; and
determining the signal loss based on the characteristic of the returned signal.

15. The method of claim 13, wherein providing the calibration signal comprises providing the calibration signal in response to a calibration command.

16. The method of claim 13, wherein determining signal loss comprises:
measuring a first power associated with the calibration signal provided on the at least one transmission line cable; and
measuring a second power associated with the returned signal on the at least one transmission line cable to determine the signal loss as a ratio of the first power and the second power.

17. The method of claim 16, wherein measuring the first power comprises measuring the first power associated with the calibration signal provided on the first transmission line cable and measuring the second power comprises measuring the second power associated with the returned signal received on the second transmission line cable.

18. The method of claim 13, further comprising switching from the transmit mode to the receive mode in response to the monitored signal power being below the predetermined threshold.

19. The method of claim 13, wherein:
the transmit signal is a first transmit signal and the receive signal is a first receive signal;
the antenna comprises a first antenna array to communicate the first transmit signal and the first receive signal, and further comprises a second antenna array to communicate a second transmit signal and a second receive signal;
the signal path is a first signal path;
adjusting the amplitude of the receive signal in the receive mode comprises adjusting the amplitude of a second receive signal in a second receive path based on the determined signal loss; and
adjusting the amplitude of the transmit signal in the transmit mode comprises adjusting the amplitude of a second transmit signal in a second transmit path based on the determined signal loss.

20. The method of claim 19, wherein:
the first receive signal and the first transmit signal are communicated between the user communication system and the antenna system via the first transmission line cable; and
the second receive signal and the second transmit signal are communicated between the user communication system and the antenna system via the second transmission line cable.

21. The method of claim 13, further comprising storing the determined signal loss in a memory.

22. The method of claim 13, wherein monitoring the signal power of the transmit signal comprises monitoring the signal power of the transmit signal via a directional coupler and a power detector.

* * * * *